(12) United States Patent
Zhuang et al.

(10) Patent No.: US 11,206,112 B2
(45) Date of Patent: Dec. 21, 2021

(54) GRANT-FREE UPLINK TRANSMISSION METHOD AND APPARATUS

(71) Applicant: Huawei Technologies Co., Ltd., Shenzhen (CN)

(72) Inventors: Hongcheng Zhuang, Shenzhen (CN); Yunbo Han, Shenzhen (CN); Zhenguo Du, Shenzhen (CN); Zhiming Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/604,907

(22) PCT Filed: Apr. 26, 2017

(86) PCT No.: PCT/CN2017/082059
§ 371 (c)(1),
(2) Date: Oct. 11, 2019

(87) PCT Pub. No.: WO2018/188120
PCT Pub. Date: Oct. 18, 2018

(65) Prior Publication Data
US 2020/0127778 A1 Apr. 23, 2020

(30) Foreign Application Priority Data
Apr. 11, 2017 (CN) .......................... 201710233673.5

(51) Int. Cl.
| H04W 4/00 | (2018.01) |
| H04L 5/00 | (2006.01) |
| H04W 76/27 | (2018.01) |
| H04L 1/00 | (2006.01) |
| H04W 28/02 | (2009.01) |
| H04W 72/04 | (2009.01) |

(52) U.S. Cl.
CPC .......... *H04L 5/0007* (2013.01); *H04L 1/0057* (2013.01); *H04W 28/0205* (2013.01);
(Continued)

(58) Field of Classification Search
None
See application file for complete search history.

(56) References Cited

U.S. PATENT DOCUMENTS

| 9,692,550 B2 | 6/2017 | Bayesteh et al. |
| 2011/0263286 A1 | 10/2011 | Damnjanovic et al. |
| (Continued) | | |

FOREIGN PATENT DOCUMENTS

| CN | 102948247 A | 2/2013 |
| CN | 104838713 A | 8/2015 |
| CN | 106507486 A | 3/2017 |

OTHER PUBLICATIONS

"3rd Generation Partnership Project;Technical Specification Group Radio Access Network;Study on New Radio Access Technology Physical Layer Aspects (Release 14)," 3GPP TR 38.802 V14.0.0, pp. 1-143, 3rd Generation Partnership Project, Valbonne, France (Mar. 2017).

(Continued)

*Primary Examiner* — Elisabeth Benoit Magloire
(74) *Attorney, Agent, or Firm* — Leydig, Voit & Mayer, Ltd.

(57) ABSTRACT

Embodiments of the present disclosure relate to a grant-free uplink transmission method and apparatus. The method includes: determining, based on received configuration information, a target grant-free transmission area and a target air interface transmission parameter corresponding to the target grant-free transmission area, where the target grant-free transmission area is an air interface time-frequency resource formed by using a specified time range and frequency range, and the configuration information includes at least one grant-free transmission area and an air interface transmission parameter corresponding to each grant-free transmission area; and sending uplink data to a base station based on the target grant-free transmission area and the target air interface transmission parameter. In this application, it can be provided that the base station can correctly receive the uplink data.

20 Claims, 3 Drawing Sheets

(52) U.S. Cl.
CPC ..... *H04W 28/0278* (2013.01); *H04W 72/044* (2013.01); *H04W 76/27* (2018.02)

(56) References Cited

U.S. PATENT DOCUMENTS

| | | |
|---|---|---|
| 2014/0192767 A1 | 7/2014 | Au et al. |
| 2015/0282045 A1* | 10/2015 | Salem ................. H04W 28/08 370/329 |
| 2016/0270102 A1* | 9/2016 | Zeng ................... H04W 72/048 |
| 2016/0366704 A1 | 12/2016 | Lee et al. |
| 2017/0171855 A1* | 6/2017 | Sundararajan ........ H04W 74/08 |
| 2017/0311182 A1* | 10/2017 | Tenny .................. H04W 12/06 |
| 2018/0167161 A1* | 6/2018 | Davydov .............. H04L 1/0011 |
| 2018/0288746 A1* | 10/2018 | Zhang .................. H04L 1/0031 |
| 2020/0137637 A1* | 4/2020 | Xu ...................... H04W 36/0055 |
| 2020/0195407 A1* | 6/2020 | Du ...................... H04W 72/0453 |

OTHER PUBLICATIONS

"3rd Generation Partnership Project; Technical Specification Group Radio Access Network;NR; Radio Resource Control (RRC); Protocol specification (Release 15 )," 3GPP TS 38.331 V0.0.2, pp. 1-13, 3rd Generation Partnership Project, Valbonne, France (Mar. 2017).

Chen Ya Fan et al.,"Decellular access/Software-defined air interface—5G System Framework Solution," Telecommunications Network Technology, Issue 5, total 20 pages (May 2015).

* cited by examiner ary range, and the configuration information includes at least one grant-free transmission area and an air interface transmission parameter corresponding to each grant-free transmission area; and
GRANT-FREE UPLINK TRANSMISSION METHOD AND APPARATUS

CROSS-REFERENCE TO RELATED APPLICATIONS

This application is a national stage of International Application No. PCT/CN2017/082059, filed on Apr. 26, 2017, which claims priority to Chinese Patent Application No. 201710233673.5, filed on Apr. 11, 2017. Both of the aforementioned applications are hereby incorporated by reference in their entireties.

TECHNICAL FIELD

Embodiments of this application relate to communications technologies, and in particular, to a grant-free uplink transmission method and apparatus.

BACKGROUND

In a cellular network, uplink data transmission is usually performed based on a request-grant manner. However, as an application scenario, a type of a terminal device, and an application type become increasingly diverse, a quantity of terminal devices is to explode in future evolution of the cellular network, and in a particular application scenario, a user may have extremely high requirements for a network latency and signaling overheads. In this case, a conventional uplink data transmission method based on the request-grant manner is no longer applicable due to relatively high latency and signaling overheads.

Compared with the conventional transmission method based on the request-grant manner, a grant-free transmission method has considerable advantages in terms of a network latency and signaling overheads because a terminal device directly uses a particular resource to send uplink data without experiencing a process from a service request to an uplink grant of a base station. Specifically, the base station indicates grant-free area information of the terminal device, to be specific, indicates a time-frequency resource, a codebook, a pilot sequence, a transport block size, or a bit rate; and the base station and the terminal device calculate, based on the time-frequency resource, the codebook, and the bit rate, sizes of transport blocks used for data, so that a transport block obtained by the base station through calculation is consistent with a transport block obtained by the terminal device through calculation. Therefore, it can be ensured that the base station can correctly perform decoding.

However, in a conventional cellular system, such as a Long Term Evolution (LTE) system, because an air interface transmission parameter is fixed, the base station can correctly receive data based on a fixed air interface transmission parameter and transport block size. However, in a New Radio (NR) system, an air interface transmission parameter is flexible. Consequently, in the existing data transmission manner, it cannot be ensured that a base station can correctly receive data.

SUMMARY

Embodiments of this application provide a grant-free uplink transmission method and apparatus, to resolve a technical problem that a base station cannot correctly receive data in an NR system.

According to a first aspect, an embodiment of this application provides a grant-free uplink transmission method, including:

determining, based on received configuration information, a target grant-free transmission area and a target air interface transmission parameter corresponding to the target grant-free transmission area, where the target grant-free transmission area is an air interface time-frequency resource formed by using a specified time range and frequency range, and the configuration information includes at least one grant-free transmission area and an air interface transmission parameter corresponding to each grant-free transmission area; and sending uplink data to a base station based on the target grant-free transmission area and the target air interface transmission parameter.

In this solution, the base station specifies the air interface transmission parameter for the grant-free transmission area, so that a terminal device uses the air interface transmission parameter delivered by the base station to send the uplink data to the base station in a corresponding grant-free transmission area. Correspondingly, the base station uses the air interface transmission parameter to receive the uplink data in the corresponding grant-free transmission area. Therefore, it can be ensured that the base station can correctly receive the uplink data.

In a specific implementation, the determining, based on received configuration information, a target grant-free transmission area and a target air interface transmission parameter corresponding to the target grant-free transmission area includes:

determining, based on a service feature of the uplink data, the target grant-free transmission area and the target air interface transmission parameter from the at least one grant-free transmission area and the air interface transmission parameter corresponding to each grant-free transmission area; or determining, based on a size of the uplink data, the target grant-free transmission area and the target air interface transmission parameter from the at least one grant-free transmission area and the air interface transmission parameter corresponding to each grant-free transmission area; or determining, based on a buffer status of the uplink data, the target grant-free transmission area and the target air interface transmission parameter from the at least one grant-free transmission area and the air interface transmission parameter corresponding to each grant-free transmission area; or determining, based on channel state information of each grant-free transmission area, the target grant-free transmission area and the target air interface transmission parameter from the at least one grant-free transmission area and the air interface transmission parameter corresponding to each grant-free transmission area.

In the foregoing solution, the service feature of the uplink data includes a parameter of the uplink data, for example, a transmission rate, a transmission latency, or a bit error rate. For example, for a grant-free low-latency service, the terminal device may select a grant-free transmission area corresponding to an air interface transmission parameter including a multi-carrier (CP-OFDM) uplink waveform, an OFDMA multiple access manner, a relatively large subcarrier spacing, or a relatively small cyclic prefix length; and for a grant-free small-packet service, the terminal device may select a grant-free transmission area corresponding to an air interface transmission parameter including a single-carrier (DFT-S-OFDM) uplink waveform, a NOMA multiple access manner, a small subcarrier spacing, or a relatively large cyclic prefix length.

The terminal device can flexibly determine the target grant-free transmission area and the target air interface transmission parameter corresponding to the target grant-free transmission area, thereby adaptively matching the service feature of the uplink data and improving flexibility in using a grant-free resource.

In a specific implementation, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

In the foregoing solution, the air interface transmission parameter is usually divided into a basic parameter and an extended parameter. The basic parameter includes a semi-static parameter such as the uplink waveform, the multiple access manner, or the channel coding scheme, and the extended parameter includes dynamic parameters such as the numerology, the maximum transmit power, and the radio frame structure. The base station usually specifies one basic parameter and at least one extended parameter for each grant-free transmission area. Alternatively, the base station may specify a plurality of basic parameters for each grant-free transmission area, and each basic parameter is corresponding to at least one extended parameter.

In a specific implementation, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

In the foregoing solution, when the multiple access manner includes the non-orthogonal multiple access manner, the air interface transmission parameter may include only the codebook and the pilot sequence, or may include only any one of the signature matrix, the spread spectrum sequence, or the power domain superposition pattern, or may include any two or more parameters of the codebook and the pilot sequence, the signature matrix, the spread spectrum sequence, or the power domain superposition pattern. The air interface transmission parameter usually includes both the codebook and the pilot sequence.

In a specific implementation, the configuration information is carried in at least one of the following information: system information, radio resource control RRC signaling, or physical layer control information.

In a specific implementation, the physical layer control information includes a group common physical downlink control channel.

In the foregoing solution, the base station may add the configuration information to the system information (SI), and deliver the configuration information to all or some of terminal devices in a system in a broadcast manner; or may add the configuration information to the RRC, and deliver the configuration information to one specific terminal device or a group of specific terminal devices in a unicast manner; or may add the configuration information to the physical layer control information, and deliver the configuration information to one specific terminal device or a group of specific terminal devices in a unicast manner. The physical layer control information includes the group common physical downlink control channel (group common PDCCH), and the like.

The configuration information may be carried in a plurality of types of information and sent to the terminal device, so that the configuration information can be sent more flexibly.

According to a second aspect, an embodiment of this application provides a grant-free uplink transmission method, including:

determining configuration information, where the configuration information includes at least one grant-free transmission area and an air interface transmission parameter corresponding to each grant-free transmission area; and receiving, based on the at least one grant-free transmission area and the air interface transmission parameter corresponding to each grant-free transmission area, uplink data sent by a terminal device.

In the foregoing solution, when the terminal device sends the uplink data to a base station, the base station receives the uplink data sent by the terminal device, based on the at least one grant-free transmission area and the air interface transmission parameter corresponding to each grant-free transmission area that are sent by the base station to the terminal device. To be specific, the base station receives, on a time-frequency resource specified by the grant-free transmission area, the uplink data sent by the terminal device, based on corresponding uplink air interface transmission parameters such as an uplink waveform, a multiple access manner, and numerology.

The base station specifies the air interface transmission parameter for the grant-free transmission area, so that the terminal device uses the air interface transmission parameter delivered by the base station to send the uplink data to the base station in a corresponding grant-free transmission area. Correspondingly, the base station uses the air interface transmission parameter to receive the uplink data in the corresponding grant-free transmission area. Therefore, it can be ensured that the base station can correctly receive the uplink data.

In a specific implementation, the receiving, based on the at least one grant-free transmission area and the air interface transmission parameter corresponding to each grant-free transmission area, uplink data sent by a terminal device includes:

receiving data successively based on the at least one grant-free transmission area and the air interface transmission parameter corresponding to each grant-free transmission area, until the uplink data is received.

In the foregoing solution, the base station may receive data successively based on the at least one grant-free transmission area and the air interface transmission parameter corresponding to each grant-free transmission area that are sent by the base station to the terminal device, until the uplink data sent by the terminal device is received.

In a specific implementation, the method further includes:

sending the configuration information to the terminal device.

In the foregoing solution, after determining the at least one grant-free transmission area, the base station specifies the air interface transmission parameter for each grant-free transmission area, binds the grant-free transmission area to the specified air interface transmission parameter, and after the binding, adds the at least one grant-free transmission area and the air interface transmission parameter bound to each grant-free transmission area to the configuration information and sends the configuration information to the terminal device.

In a specific implementation, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

In the foregoing solution, the air interface transmission parameter is usually divided into a basic parameter and an extended parameter. The basic parameter includes a semistatic parameter such as the uplink waveform, the multiple access manner, or the channel coding scheme, and the extended parameter includes dynamic parameters such as the numerology, the maximum transmit power, and the radio frame structure. The base station usually specifies one basic parameter and at least one extended parameter for each grant-free transmission area. Alternatively, the base station may specify a plurality of basic parameters for each grant-free transmission area, and each basic parameter is corresponding to at least one extended parameter.

In a specific implementation, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

In the foregoing solution, when the multiple access manner includes the non-orthogonal multiple access manner, the air interface transmission parameter may include only the codebook and the pilot sequence, or may include only any one of the signature matrix, the spread spectrum sequence, or the power domain superposition pattern, or may include any two or more parameters of the codebook and the pilot sequence, the signature matrix, the spread spectrum sequence, or the power domain superposition pattern. The air interface transmission parameter usually includes both the codebook and the pilot sequence.

In a specific implementation, the configuration information is carried in at least one of the following information: system information, radio resource control RRC signaling, or physical layer control information.

In a specific implementation, the physical layer control information includes a group common physical downlink control channel.

In the foregoing solution, the base station may add the configuration information to the system information (SI), and deliver the configuration information to all or some of terminal devices in a system in a broadcast manner; or may add the configuration information to the RRC, and deliver the configuration information to one specific terminal device or a group of specific terminal devices in a unicast manner; or may add the configuration information to the physical layer control information, and deliver the configuration information to one specific terminal device or a group of specific terminal devices in a unicast manner. The physical layer control information includes the group common physical downlink control channel (group common PDCCH), and the like.

The configuration information may be carried in a plurality of types of information and sent to the terminal device, so that the configuration information can be sent more flexibly.

According to a third aspect, an embodiment of this application provides a grant-free uplink transmission apparatus, including:

a determining module, configured to determine, based on received configuration information, a target grant-free transmission area and a target air interface transmission parameter corresponding to the target grant-free transmission area, where the target grant-free transmission area is an air interface time-frequency resource formed by using a specified time range and frequency range, and the configuration information includes at least one grant-free transmission area and an air interface transmission parameter corresponding to each grant-free transmission area; and a sending module, configured to send uplink data to a base station based on the target grant-free transmission area and the target air interface transmission parameter.

In a specific implementation, the determining module is specifically configured to:

determine, based on a service feature of the uplink data, the target grant-free transmission area and the target air interface transmission parameter from the at least one grant-free transmission area and the air interface transmission parameter corresponding to each grant-free transmission area; or determine, based on a size of the uplink data, the target grant-free transmission area and the target air interface transmission parameter from the at least one grant-free transmission area and the air interface transmission parameter corresponding to each grant-free transmission area; or determine, based on a buffer status of the uplink data, the target grant-free transmission area and the target air interface transmission parameter from the at least one grant-free transmission area and the air interface transmission parameter corresponding to each grant-free transmission area; or determine, based on channel state information of each grant-free transmission area, the target grant-free transmission area and the target air interface transmission parameter from the at least one grant-free transmission area and the air interface transmission parameter corresponding to each grant-free transmission area.

In a specific implementation, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

In a specific implementation, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

In a specific implementation, the configuration information is carried in at least one of the following information: system information, radio resource control RRC signaling, or physical layer control information.

In a specific implementation, the physical layer control information includes a group common physical downlink control channel.

According to a fourth aspect, an embodiment of this application provides a grant-free uplink transmission apparatus, including:

a determining module, configured to determine configuration information, where the configuration information includes at least one grant-free transmission area and an air interface transmission parameter corresponding to each grant-free transmission area; and a receiving module, configured to receive, based on the at least one grant-free transmission area and the air interface transmission parameter corresponding to each grant-free transmission area, uplink data sent by a terminal device.

In a specific implementation, the receiving module is specifically configured to:

receive data successively based on the at least one grant-free transmission area and the air interface transmission parameter corresponding to each grant-free transmission area, until the uplink data is received.

In a specific implementation, the apparatus further includes:

a sending module, configured to send the configuration information to the terminal device.

In a specific implementation, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

In a specific implementation, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

In a specific implementation, the configuration information is carried in at least one of the following information: system information, radio resource control RRC signaling, or physical layer control information.

In a specific implementation, the physical layer control information includes a group common physical downlink control channel.

According to a fifth aspect, an embodiment of this application provides a terminal device, including:

a processor, configured to determine, based on received configuration information, a target grant-free transmission area and a target air interface transmission parameter corresponding to the target grant-free transmission area, where the target grant-free transmission area is an air interface time-frequency resource formed by using a specified time range and frequency range, and the configuration information includes at least one grant-free transmission area and an air interface transmission parameter corresponding to each grant-free transmission area; and a transmitter, configured to send uplink data to a base station based on the target grant-free transmission area and the target air interface transmission parameter.

In a specific implementation, the processor is specifically configured to:

determine, based on a service feature of the uplink data, the target grant-free transmission area and the target air interface transmission parameter from the at least one grant-free transmission area and the air interface transmission parameter corresponding to each grant-free transmission area; or determine, based on a size of the uplink data, the target grant-free transmission area and the target air interface transmission parameter from the at least one grant-free transmission area and the air interface transmission parameter corresponding to each grant-free transmission area; or determine, based on a buffer status of the uplink data, the target grant-free transmission area and the target air interface transmission parameter from the at least one grant-free transmission area and the air interface transmission parameter corresponding to each grant-free transmission area; or determine, based on channel state information of each grant-free transmission area, the target grant-free transmission area and the target air interface transmission parameter from the at least one grant-free transmission area and the air interface transmission parameter corresponding to each grant-free transmission area.

In a specific implementation, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

In a specific implementation, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

In a specific implementation, the configuration information is carried in at least one of the following information: system information, radio resource control RRC signaling, or physical layer control information.

In a specific implementation, the physical layer control information includes a group common physical downlink control channel.

In a specific implementation of the foregoing terminal device, a memory may further be included. There is at least one processor, configured to execute a computer executable instruction stored in the memory, so that the terminal device exchanges data with the base station through a communications interface, to perform the grant-free uplink transmission method provided in the first aspect or the implementations of the first aspect. Optionally, the memory may be integrated into the processor.

According to a sixth aspect, an embodiment of this application provides a base station, including:

a processor, configured to determine configuration information, where the configuration information includes at least one grant-free transmission area and an air interface transmission parameter corresponding to each grant-free transmission area; and a receiver, configured to receive, based on the at least one grant-free transmission area and the air interface transmission parameter corresponding to each grant-free transmission area, uplink data sent by a terminal device.

In a specific implementation, the receiver is specifically configured to:

receive data successively based on the at least one grant-free transmission area and the air interface transmission parameter corresponding to each grant-free transmission area, until the uplink data is received.

In a specific implementation, the base station further includes:

a transmitter, configured to send the configuration information to the terminal device.

In a specific implementation, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

In a specific implementation, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

In a specific implementation, the configuration information is carried in at least one of the following information: system information, radio resource control RRC signaling, or physical layer control information.

In a specific implementation, the physical layer control information includes a group common physical downlink control channel.

In a specific implementation of the foregoing base station, a memory may further be included. There is at least one processor, configured to execute a computer executable instruction stored in the memory, so that the base station exchanges data with the terminal device through a communications interface, to perform the grant-free uplink transmission method provided in the second aspect or the implementations of the second aspect. Optionally, the memory may be integrated into the processor.

A seventh aspect of this application provides a storage medium, including a readable storage medium and a computer program, where the computer program is used to implement the grant-free uplink transmission method provided in any implementation of the first aspect.

An eighth aspect of this application provides a storage medium, including a readable storage medium and a computer program, where the computer program is used to implement the grant-free uplink transmission method provided in any implementation of the second aspect.

A ninth aspect of this application provides a program product, where the program product includes a computer program (namely, an executable instruction), and the computer program is stored in a readable storage medium. At least one processor of a terminal device may read the computer program from the readable storage medium, and the at least one processor executes the computer program to enable the terminal device to implement the grant-free uplink transmission method provided in the first aspect or the implementations of the first aspect.

A tenth aspect of this application provides a program product, where the program product includes a computer program (namely, an executable instruction), and the computer program is stored in a readable storage medium. At least one processor of a base station may read the computer program from the readable storage medium, and the at least one processor executes the computer program to enable the base station to implement the grant-free uplink transmission method provided in the second aspect or the implementations of the second aspect.

According to the grant-free uplink transmission method and apparatus provided in the embodiments of this application, the target grant-free transmission area and target air interface transmission parameter corresponding to the target grant-free transmission area are determined based on the received configuration information, and the uplink data is sent to the base station based on the target grant-free transmission area and the target air interface transmission parameter. The base station specifies the air interface transmission parameter for the grant-free transmission area, so that the terminal device uses the air interface transmission parameter delivered by the base station to send the uplink data to the base station in a corresponding grant-free transmission area. Correspondingly, the base station uses the air interface transmission parameter to receive the uplink data in the corresponding grant-free transmission area. Therefore, it can be ensured that the base station can correctly receive the uplink data.

DESCRIPTION OF EMBODIMENTS

A grant-free uplink transmission method and apparatus in embodiments of this application are applicable to a wireless communications system, for example, may be applied to a 3rd Generation Partnership Project (3GPP) New Radio (NR) system, or may be applied to another subsequent wireless communications system.

The grant-free uplink transmission method in the embodiments of this application is mainly specific to how a base station correctly receives data in the NR system. In the prior art, in a conventional cellular system, during grant-free transmission, a terminal device directly uses a particular resource to send uplink data, to be specific, may use a fixed air interface transmission parameter for data transmission. The base station indicates grant-free area information of the terminal device, to be specific, indicates a time-frequency resource, a codebook, a pilot sequence, a transport block size, a bit rate, or the like; and the base station and the terminal device calculate, based on the time-frequency resource, the codebook, and the bit rate, sizes of transport blocks used for data, so that a transport block obtained by the base station through calculation is consistent with a transport block obtained by the terminal device through calculation.

Therefore, it can be ensured that the base station can correctly perform decoding. However, in the NR system, because an air interface transmission parameter is flexible, if an existing data transmission manner is still used, it cannot be ensured that the base station can correctly receive data.

Therefore, the grant-free uplink transmission method and apparatus provided in the embodiments of this application are intended to resolve a prior-art technical problem that a base station cannot correctly receive data in an NR system.

The following describes the technical solutions of this application in detail by using specific embodiments. The following several specific embodiments may be combined with each other, and a same or similar concept or process may not be described repeatedly in some embodiments.

Figure 1:
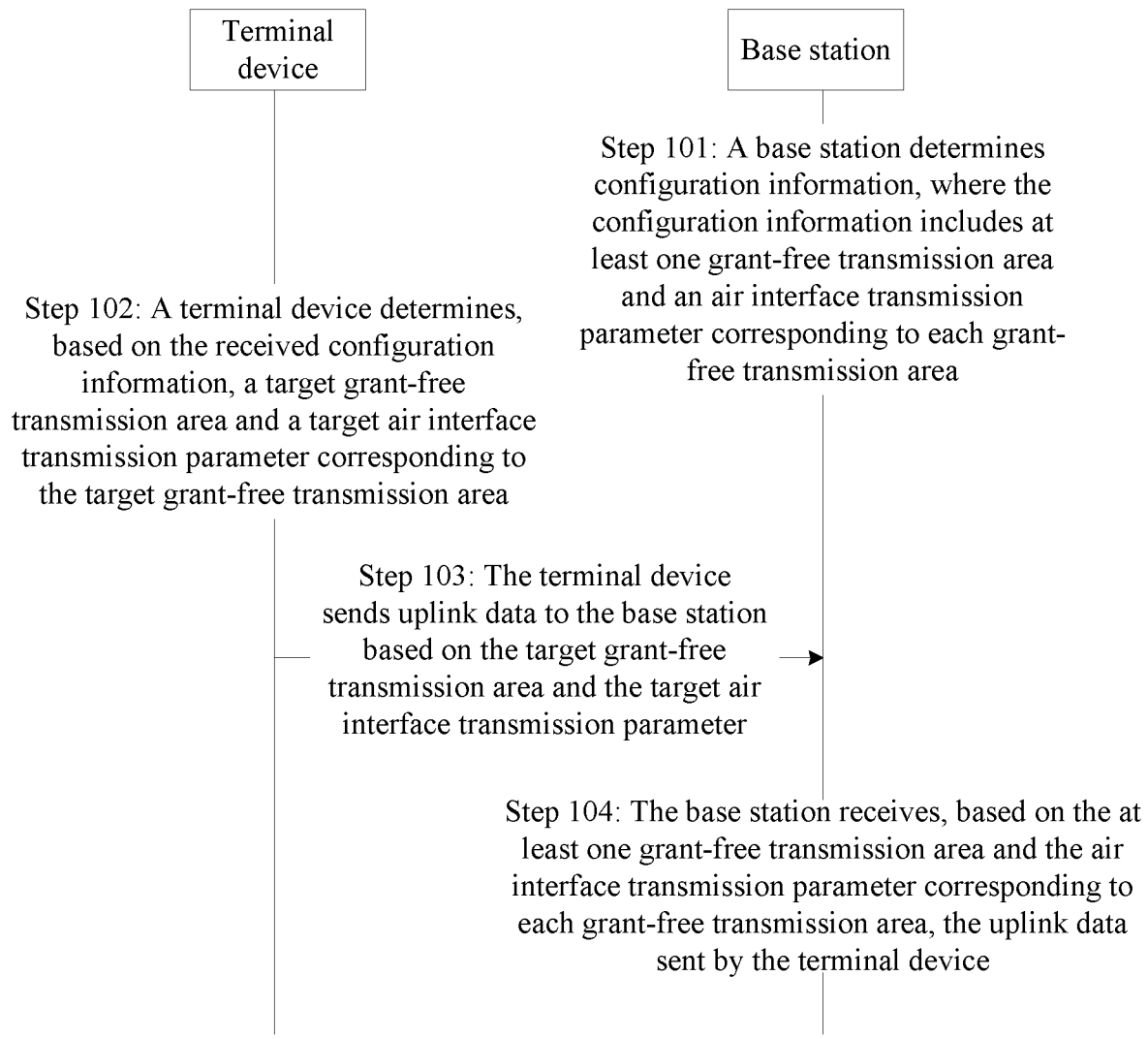
FIG. 1 is a signaling flowchart of Embodiment 1 of a grant-free uplink transmission method according to an embodiment of this application.

FIG. 1 is a signaling flowchart of Embodiment 1 of a grant-free uplink transmission method according to an embodiment of this application. As shown in FIG. 1, the method includes the following steps.

Step 101: A base station determines configuration information, where the configuration information includes at least one grant-free transmission area and an air interface transmission parameter corresponding to each grant-free transmission area.

In this embodiment, each grant-free transmission area includes a time resource and a frequency resource. After determining the at least one grant-free transmission area, the base station specifies the air interface transmission parameter for each grant-free transmission area, binds the grant-free transmission area to the specified air interface transmission parameter, and after the binding, adds the at least one grant-free transmission area and the air interface transmission parameter bound to each grant-free transmission area to the configuration information and sends the configuration information to a terminal device.

Optionally, the air interface transmission parameter includes at least one of the following information: an uplink waveform, a multiple access manner, numerology, a maximum transmit power, a radio frame structure, or a channel coding scheme, where the uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

Specifically, the air interface transmission parameter is usually divided into a basic parameter and an extended parameter. The basic parameter includes semi-static parameters such as the uplink waveform, the multiple access manner, and the channel coding scheme, and the extended parameter includes dynamic parameters such as the numerology, the maximum transmit power, and the radio frame structure. The base station usually specifies one basic parameter and at least one extended parameter for each grant-free transmission area. Alternatively, the base station may specify a plurality of basic parameters for each grant-free transmission area, and each basic parameter is corresponding to at least one extended parameter.

In addition, the uplink waveform includes single-carrier discrete Fourier transform spread orthogonal frequency division multiplexing (DFT-S-OFDM) and multi-carrier cyclic prefix orthogonal frequency division multiplexing (CP-OFDM), and the multiple access manner includes orthogonal frequency division multiple access (OFDMA) and non-orthogonal multiple access (NOMA).

Optionally, if the multiple access manner includes the non-orthogonal multiple access manner, the air interface transmission parameter further includes at least one of the following information: a codebook and a pilot sequence, a signature matrix, a spread spectrum sequence, or a power domain superposition pattern. Specifically, when the multiple access manner includes the non-orthogonal multiple access manner, the air interface transmission parameter may include only the codebook and the pilot sequence, or may include only any one of the signature matrix, the spread spectrum sequence, or the power domain superposition pattern, or may include any two or more parameters of the codebook and the pilot sequence, the signature matrix, the spread spectrum sequence, or the power domain superposition pattern. The air interface transmission parameter usually includes both the codebook and the pilot sequence.

It should be noted that, the grant-free transmission area and the uplink air interface transmission parameter such as the uplink waveform, the multiple access manner, or the numerology that is specified for the grant-free transmission area are not fixed. In actual application, the base station may redetermine a grant-free transmission area depending on an actual situation, and grant-free transmission areas that are determined at two consecutive times differ from each other in at least a time resource or a frequency resource. Alternatively, the base station may re-specify an uplink air interface transmission parameter such as an uplink waveform, a multiple access manner, or numerology for the grant-free transmission area, and the re-specified uplink air interface transmission parameter is different from an uplink air interface transmission parameter specified last time.

Once the grant-free transmission area or the uplink air interface transmission parameter such as the uplink waveform, the multiple access manner, or the numerology that is specified for the grant-free transmission area changes, the base station needs to resend configuration information to the terminal device. The configuration information includes the following content: at least one grant-free transmission area after the change and an uplink air interface transmission parameter such as an uplink waveform, a multiple access manner, or numerology that is specified for each grant-free transmission area.

Optionally, the configuration information sent by the base station to the terminal device may be carried in at least one of the following information: system information, radio resource control (RRC) signaling, or physical layer control information.

Specifically, the base station may deliver the configuration information to the terminal device, to indicate the at least one grant-free transmission area and the air interface transmission parameter corresponding to each grant-free transmission area. The base station may deliver the configuration information in the following several manners, including but not limited to:

Manner 1: The base station adds the configuration information to the system information (SI), and delivers the configuration information to all or some of terminal devices in a system in a broadcast manner.

Manner 2: The base station adds the configuration information to the RRC, and delivers the configuration information to one specific terminal device or a group of specific terminal devices in a unicast manner.

Manner 3: The base station adds the configuration information to the physical layer control information, and delivers the configuration information to one specific terminal device or a group of specific terminal devices in a unicast manner. The physical layer control information includes a group common physical downlink control channel (group common PDCCH), and the like.

It should be noted that, the base station may add all air interface transmission parameters to the configuration information and send the configuration information to the terminal device in any one of the foregoing manners. Alternatively, the base station may add the semi-static parameter such as the uplink waveform, the multiple access manner, or the channel coding scheme to the configuration information and deliver the configuration information to the terminal device in Manner 1, and add the dynamic parameters such as the subcarrier spacing, the cyclic prefix length, and the maximum transmit power to the configuration information and deliver the configuration information to the terminal device in Manner 2 and/or Manner 3. In other words, the base station may deliver the dynamic parameters to the terminal device only in Manner 2, or may deliver the dynamic parameters to the terminal device only in Manner 3, or may divide the dynamic parameters into two parts, deliver the first part to the terminal device in Manner 2, and deliver the second part to the terminal device in Manner 3. A specific manner of sending the configuration information is not limited in this embodiment.

In addition, the configuration information may directly include the at least one grant-free transmission area and the air interface transmission parameter corresponding to each grant-free transmission area, or may include a grant-free transmission area index and an air interface transmission parameter index, and establish a one-to-one correspondence between the grant-free transmission area index and the air interface transmission parameter index. In this way, after receiving the configuration information, the terminal device may learn of an air interface transmission parameter corresponding to a grant-free transmission area indicated by the grant-free transmission area index. For example, Table 1 shows an optional implementation of the configuration information:

TABLE 1

| Grant-free transmission area index | Time-frequency resource | Air interface transmission parameter index | Basic parameter | Extended parameter |
|---|---|---|---|---|
| 1 | Time domain resource, and frequency domain resource | 1 | Uplink waveform (DFT-S-OFDM), multiple access manner (OFDMA), and channel coding scheme (LDPC: low-density parity-check) | Numerology (a subcarrier spacing and a cyclic prefix length), modulation and demodulation manner, and maximum uplink transmit power |
| 2 | Time domain resource, and frequency domain resource | 2 | Uplink waveform (CP-OFDM), multiple access manner (NOMA), channel coding scheme (polar code) | Numerology (a subcarrier spacing and a cyclic prefix length), and maximum uplink transmit power |
| ... | ... | ... | ... | ... |

As shown in Table 1, in the configuration information, the air interface transmission parameter may include the basic parameter and the extended parameter, and a grant-free transmission area indicated by the grant-free transmission area index 1 is corresponding to an air interface transmission parameter indicated by the air interface transmission parameter index 1. If the multiple access manner is the NOMA, the extended parameter further includes at least one of a codebook and a pilot sequence, a spread spectrum sequence, or a power domain superposition pattern.

In addition, Table 2 shows another optional implementation of the configuration information:

TABLE 2

| Grant-free transmission area index | Time-frequency resource | Air interface transmission parameter index | Air interface transmission parameter |
|---|---|---|---|
| 1 | Time domain resource, and frequency domain resource | 1 | Uplink waveform (DFT-S-OFDM), multiple access manner (OFDMA), channel coding scheme (LDPC), numerology (a subcarrier spacing and a CP length), modulation and demodulation manner, and maximum uplink transmit power |
| 2 | Time domain resource, and frequency domain resource | 2 | Uplink waveform (CP-OFDM), multiple access manner (NOMA), numerology (a subcarrier spacing and a CP length), channel coding scheme (polar code), maximum uplink transmit power |
| ... | ... | ... | ... |

As shown in Table 2, the configuration information may directly carry the air interface transmission parameter, and a grant-free transmission area indicated by the grant-free transmission area index 1 is corresponding to an air interface transmission parameter indicated by the air interface transmission parameter index 1. If the multiple access manner is the NOMA, the air interface transmission parameter further includes at least one of a codebook and a pilot sequence, a spread spectrum sequence, or a power domain superposition pattern.

In this embodiment, the configuration information may directly carry the grant-free transmission area index and the corresponding air interface transmission parameter index, so that signaling resources can be saved.

Step 102: A terminal device determines, based on the received configuration information, a target grant-free transmission area and a target air interface transmission parameter corresponding to the target grant-free transmission area.

The target grant-free transmission area is an air interface time-frequency resource formed by using a specified time range and frequency range, and the configuration information includes the at least one grant-free transmission area and the air interface transmission parameter corresponding to each grant-free transmission area. In addition, there may be one or more target grant-free transmission areas.

It should be noted that, the base station periodically or aperiodically delivers the configuration information to the terminal device by using the system information, the RRC, or the physical layer control information, and then the terminal device stores the received configuration information. When needing to send uplink data, the terminal device determines, based on most recently stored configuration information, the target grant-free transmission area and the target air interface transmission parameter corresponding to the target grant-free transmission area from the at least one grant-free transmission area and the corresponding air interface transmission parameter, and sends the uplink data.

Optionally, that a terminal device determines, based on the received configuration information, a target grant-free transmission area and a target air interface transmission parameter corresponding to the target grant-free transmission area includes the following cases.

Case 1: Determine, based on a service feature of the uplink data, the target grant-free transmission area and the target air interface transmission parameter from the at least one grant-free transmission area and the air interface transmission parameter corresponding to each grant-free transmission area.

Specifically, the service feature of the uplink data includes a parameter such as a transmission rate, a transmission latency, or a bit error rate of the uplink data. After receiving the configuration information delivered by the base station, the terminal device may determine, based on the service feature of the uplink data, one or more proper target grant-free transmission areas and target air interface transmission parameters corresponding to the target grant-free transmission areas from the at least one grant-free transmission area and the air interface transmission parameter corresponding to each grant-free transmission area that are carried in the configuration information. For example, for a grant-free low-latency service, the terminal device may select a grant-free transmission area corresponding to an air interface transmission parameter including a multi-carrier (CP-OFDM) uplink waveform, an OFDMA multiple access manner, a relatively large subcarrier spacing, or a relatively small cyclic prefix length.

Case 2: Determine, based on a size of the uplink data, the target grant-free transmission area and the target air interface transmission parameter from the at least one grant-free transmission area and the air interface transmission parameter corresponding to each grant-free transmission area.

Specifically, after receiving the configuration information delivered by the base station, the terminal device may determine, based on the size of the uplink data, one or more proper target grant-free transmission areas and target air interface transmission parameters corresponding to the target grant-free transmission areas from the at least one grant-free transmission area and the air interface transmission parameter corresponding to each grant-free transmission area that are carried in the configuration information. For example, for a grant-free small-packet service, the terminal device may select a grant-free transmission area corresponding to an air interface transmission parameter including a single-carrier (DFT-S-OFDM) uplink waveform, a NOMA multiple access manner, a small subcarrier spacing, or a relatively large cyclic prefix length.

Case 3: Determine, based on a buffer status of the uplink data, the target grant-free transmission area and the target air interface transmission parameter from the at least one grant-free transmission area and the air interface transmission parameter corresponding to each grant-free transmission area.

Specifically, after receiving the configuration information delivered by the base station, the terminal device may determine, based on the buffer status of the uplink data, one or more proper target grant-free transmission areas and target air interface transmission parameters corresponding to the target grant-free transmission areas from the at least one grant-free transmission area and the air interface transmission parameter corresponding to each grant-free transmission area that are carried in the configuration information.

Case 4: Determine, based on channel state information of each grant-free transmission area, the target grant-free transmission area and the target air interface transmission parameter from the at least one grant-free transmission area and the air interface transmission parameter corresponding to each grant-free transmission area.

Specifically, after receiving the configuration information delivered by the base station, the terminal device may determine, based on a channel condition of each grant-free transmission area, for example, based on channel quality of each grant-free transmission area, one or more proper target grant-free transmission areas and target air interface transmission parameters corresponding to the target grant-free transmission areas from the at least one grant-free transmission area and the air interface transmission parameter corresponding to each grant-free transmission area that are carried in the configuration information.

The terminal device can flexibly determine the target grant-free transmission area and the target air interface transmission parameter corresponding to the target grant-free transmission area, thereby adaptively matching the service feature of the uplink data and improving flexibility in using a grant-free resource.

Step 103: The terminal device sends uplink data to the base station based on the target grant-free transmission area and the target air interface transmission parameter.

In this embodiment, when the terminal device needs to send uplink data and is allowed to transmit the uplink data in a grant-free mode, the terminal device uses the determined target air interface transmission parameter to send the uplink data to the base station in the corresponding target grant-free transmission area.

Step 104: The base station receives, based on the at least one grant-free transmission area and the air interface transmission parameter corresponding to each grant-free transmission area, the uplink data sent by the terminal device.

In this embodiment, when the terminal device sends the uplink data to the base station, the base station receives the uplink data sent by the terminal device, based on the at least one grant-free transmission area and the air interface transmission parameter corresponding to each grant-free transmission area that are sent by the base station to the terminal device. To be specific, the base station receives, on a time-frequency resource specified by the grant-free transmission area, the uplink data sent by the terminal device, based on corresponding uplink air interface transmission parameters such as an uplink waveform, a multiple access manner, and numerology. Optionally, the base station may receive data successively based on the at least one grant-free transmission area and the air interface transmission parameter corresponding to each grant-free transmission area that are sent by the base station to the terminal device, until the uplink data sent by the terminal device is received.

According to the grant-free uplink transmission method provided in this embodiment of this application, the target grant-free transmission area and target air interface transmission parameter corresponding to the target grant-free transmission area are determined based on the received configuration information, and the uplink data is sent to the base station based on the target grant-free transmission area and the target air interface transmission parameter. The base station specifies the air interface transmission parameter for the grant-free transmission area, so that the terminal device uses the air interface transmission parameter delivered by the base station to send the uplink data to the base station in a corresponding grant-free transmission area. Correspondingly, the base station uses the air interface transmission parameter to receive the uplink data in the corresponding grant-free transmission area. Therefore, it can be ensured that the base station can correctly receive the uplink data.

Figure 2:
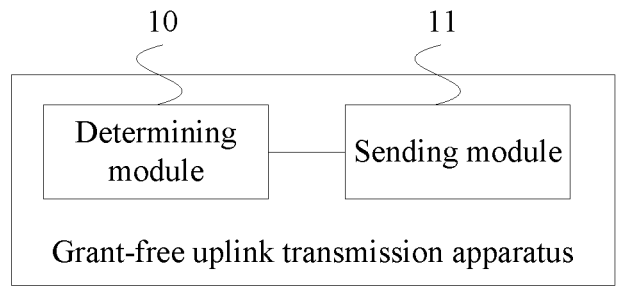
FIG. 2 is a schematic structural diagram of Embodiment 1 of a grant-free uplink transmission apparatus according to an embodiment of this application.

FIG. 2 is a schematic structural diagram of Embodiment 1 of a grant-free uplink transmission apparatus according to an embodiment of this application. The transmission apparatus may be an independent terminal device, or may be an apparatus integrated in a terminal device. The apparatus may be implemented by using software, hardware, or a combination of software and hardware. As shown in FIG. 2, the grant-free uplink transmission apparatus includes:

a determining module 10, configured to determine, based on received configuration information, a target grant-free transmission area and a target air interface transmission parameter corresponding to the target grant-free transmission area, where the target grant-free transmission area is an air interface time-frequency resource formed by using a specified time range and frequency range, and the configuration information includes at least one grant-free transmission area and an air interface transmission parameter corresponding to each grant-free transmission area; and a sending module 11, configured to send uplink data to a base station based on the target grant-free transmission area and the target air interface transmission parameter.

Optionally, the determining module 10 may correspondingly be a processor in the terminal device; and the sending module 11 may be a transmitter in the terminal device, or the sending module 11 may further be integrated with some functions of the processor.

The grant-free uplink transmission apparatus provided in this embodiment of the present disclosure may execute the foregoing method embodiment. Implementation principles and technical effects thereof are similar, and details are not described herein again.

Optionally, the determining module 10 is specifically configured to:

determine, based on a service feature of the uplink data, the target grant-free transmission area and the target air interface transmission parameter from the at least one grant-free transmission area and the air interface transmission parameter corresponding to each grant-free transmission area; or determine, based on a size of the uplink data, the target grant-free transmission area and the target air interface transmission parameter from the at least one grant-free transmission area and the air interface transmission parameter corresponding to each grant-free transmission area; or determine, based on a buffer status of the uplink data, the target grant-free transmission area and the target air interface transmission parameter from the at least one grant-free transmission area and the air interface transmission parameter corresponding to each grant-free transmission area; or determine, based on channel state information of each grant-free transmission area, the target grant-free transmission area and the target air interface transmission parameter from the at least one grant-free transmission area and the air interface transmission parameter corresponding to each grant-free transmission area.

Optionally, the air interface transmission parameter includes at least one of the following information: an uplink waveform, a multiple access manner, numerology, a maximum transmit power, a radio frame structure, or a channel coding scheme. The uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

Optionally, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

Optionally, the configuration information is carried in at least one of the following information: system information, radio resource control RRC signaling, or physical layer control information.

Optionally, the physical layer control information includes a group common physical downlink control channel.

The grant-free uplink transmission apparatus provided in this embodiment of this application may execute the foregoing method embodiment. Implementation principles and technical effects thereof are similar, and details are not described herein again.

Figure 3:
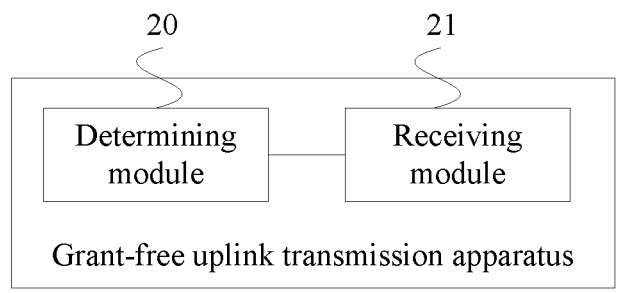
FIG. 3 is a schematic structural diagram of Embodiment 2 of a grant-free uplink transmission apparatus according to an embodiment of this application.

FIG. 3 is a schematic structural diagram of Embodiment 2 of a grant-free uplink transmission apparatus according to an embodiment of this application. The transmission apparatus may be an independent base station, or may be an apparatus integrated in a base station. The apparatus may be implemented by using software, hardware, or a combination of software and hardware. As shown in FIG. 3, the grant-free uplink transmission apparatus includes:

a determining module 20, configured to determine configuration information, where the configuration information includes at least one grant-free transmission area and an air interface transmission parameter corresponding to each grant-free transmission area; and a receiving module 21, configured to receive, based on the at least one grant-free transmission area and the air interface transmission parameter corresponding to each grant-free transmission area, uplink data sent by a terminal device.

Optionally, the determining module 20 may correspondingly be a processor in the base station; and the receiving module 21 may be a receiver in the base station, or the receiving module 21 may further be integrated with some functions of the processor.

The grant-free uplink transmission apparatus provided in this embodiment of the present disclosure may execute the foregoing method embodiment. Implementation principles and technical effects thereof are similar, and details are not described herein again.

Optionally, the receiving module 21 is specifically configured to:

receive data successively based on the at least one grant-free transmission area and the air interface transmission parameter corresponding to each grant-free transmission area, until the uplink data is received.

Figure 4:
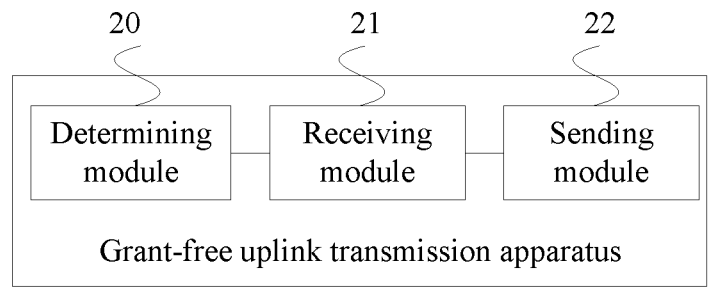
FIG. 4 is a schematic structural diagram of Embodiment 3 of a grant-free uplink transmission apparatus according to an embodiment of this application.

FIG. 4 is a schematic structural diagram of Embodiment 3 of a grant-free uplink transmission apparatus according to an embodiment of this application. As shown in FIG. 4, the apparatus further includes a sending module 22.

The sending module 22 is configured to send the configuration information to the terminal device.

Optionally, the sending module 22 may correspondingly be a transmitter in the base station, or the sending module 22 may further be integrated with some functions of the processor.

The grant-free uplink transmission apparatus provided in this embodiment of the present disclosure may execute the foregoing method embodiment. Implementation principles and technical effects thereof are similar, and details are not described herein again.

Optionally, the air interface transmission parameter includes at least one of the following information: an uplink waveform, a multiple access manner, numerology, a maximum transmit power, a radio frame structure, or a channel coding scheme. The uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

Optionally, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

Optionally, the configuration information is carried in at least one of the following information: system information, radio resource control RRC signaling, or physical layer control information.

Optionally, the physical layer control information includes a group common physical downlink control channel.

The grant-free uplink transmission apparatus provided in this embodiment of the present disclosure may execute the foregoing method embodiment. Implementation principles and technical effects thereof are similar, and details are not described herein again.

Figure 5:
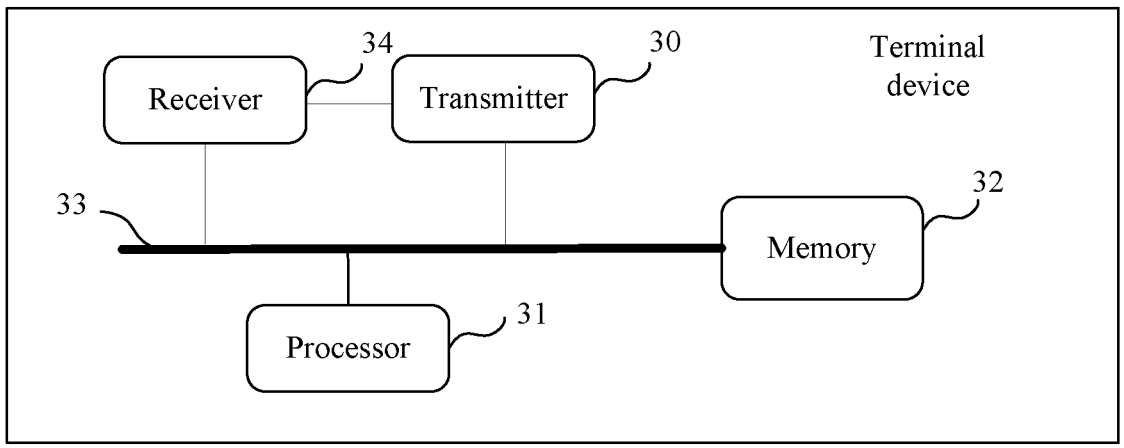
FIG. 5 is a schematic structural diagram of an embodiment of a terminal device according to an embodiment of this application.

FIG. 5 is a schematic structural diagram of an embodiment of a terminal device according to an embodiment of this application. As shown in FIG. 5, the terminal device may include a transmitter 30, a processor 31, a memory 32, and at least one communications bus 33. The communications bus 33 is configured to implement a communication connection between elements. The memory 32 may include a high-speed RAM memory, and may further include a nonvolatile memory NVM, for example, at least one magnetic disk storage. The memory 32 may store various programs, to complete various processing functions and implement method steps in this embodiment. Optionally, the terminal device may further include a receiver 34. The receiver 34 in this embodiment may be a corresponding input interface that has a communication function and an information receiving function, or may be a radio frequency module or a baseband module in the terminal device. The transmitter 30 in this embodiment may be a corresponding output interface that has a communication function and an information sending function, or may be a radio frequency module or a baseband module in the terminal device. Optionally, the transmitter 30 and the receiver 34 may be integrated in one communications interface, or may be two independent communications interfaces.

In this embodiment, the processor 31 is configured to determine, based on received configuration information, a target grant-free transmission area and a target air interface transmission parameter corresponding to the target grant-free transmission area. The target grant-free transmission area is an air interface time-frequency resource formed by using a specified time range and frequency range, and the configuration information includes at least one grant-free transmission area and an air interface transmission parameter corresponding to each grant-free transmission area.

The transmitter 30 is configured to send uplink data to a base station based on the target grant-free transmission area and the target air interface transmission parameter.

Optionally, the processor 31 is specifically configured to:
determine, based on a service feature of the uplink data, the target grant-free transmission area and the target air interface transmission parameter from the at least one grant-free transmission area and the air interface transmission parameter corresponding to each grant-free transmission area; or
determine, based on a size of the uplink data, the target grant-free transmission area and the target air interface transmission parameter from the at least one grant-free transmission area and the air interface transmission parameter corresponding to each grant-free transmission area; or
determine, based on a buffer status of the uplink data, the target grant-free transmission area and the target air interface transmission parameter from the at least one grant-free transmission area and the air interface transmission parameter corresponding to each grant-free transmission area; or
determine, based on channel state information of each grant-free transmission area, the target grant-free transmission area and the target air interface transmission parameter from the at least one grant-free transmission area and the air interface transmission parameter corresponding to each grant-free transmission area.

Optionally, the air interface transmission parameter includes at least one of the following information: an uplink waveform, a multiple access manner, numerology, a maximum transmit power, a radio frame structure, or a channel coding scheme. The uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

Optionally, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

Optionally, the configuration information is carried in at least one of the following information: system information, radio resource control RRC signaling, or physical layer control information.

Optionally, the physical layer control information includes a group common physical downlink control channel.

The terminal device provided in this embodiment of the present disclosure may execute the foregoing method embodiment. Implementation principles and technical effects thereof are similar, and details are not described herein again.

Figure 6:
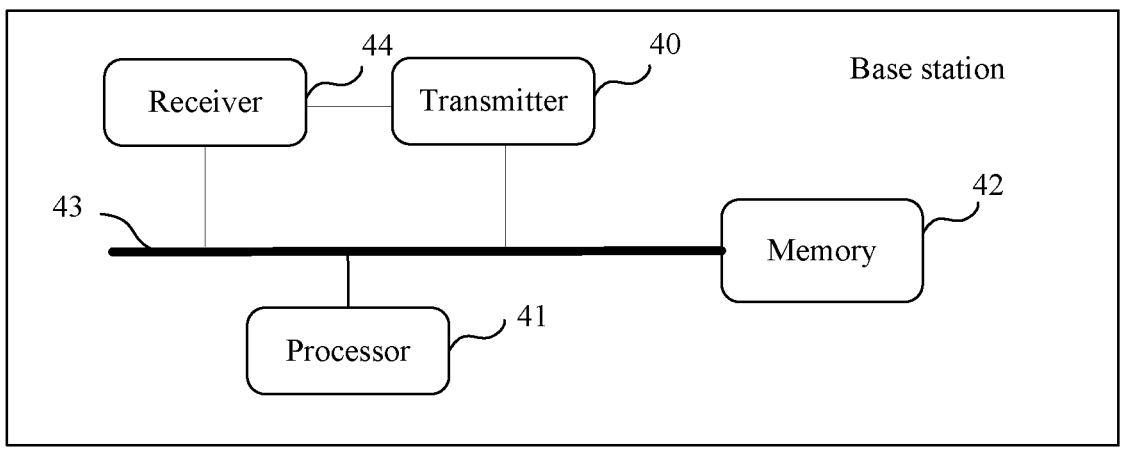
FIG. 6 is a schematic structural diagram of an embodiment of a base station according to an embodiment of this application.

FIG. 6 is a schematic structural diagram of an embodiment of a base station according to an embodiment of this application. As shown in FIG. 6, the base station may include a receiver 44, a processor 41, a memory 42, and at least one communications bus 43. The communications bus 43 is configured to implement a communication connection between elements. The memory 42 may include a high-speed RAM memory, and may further include a nonvolatile memory NVM, for example, at least one magnetic disk storage. The memory 42 may store various programs, to complete various processing functions and implement method steps in this embodiment. Optionally, the base station may further include a transmitter 40. The receiver 44 in this embodiment may be a corresponding input interface that has a communication function and an information receiving function, or may be a radio frequency module or a baseband module in the base station. The transmitter 40 in this embodiment may be a corresponding output interface that has a communication function and an information sending function, or may be a radio frequency module or a baseband module in the base station. Optionally, the transmitter 40 and the receiver 44 may be integrated in one communications interface, or may be two independent communications interfaces.

In this embodiment, the processor 41 is configured to determine configuration information. The configuration information includes at least one grant-free transmission area and an air interface transmission parameter corresponding to each grant-free transmission area.

The receiver 44 is configured to receive, based on the at least one grant-free transmission area and the air interface transmission parameter corresponding to each grant-free transmission area, uplink data sent by a terminal device.

Optionally, the receiver 44 is specifically configured to: receive data successively based on the at least one grant-free transmission area and the air interface transmission parameter corresponding to each grant-free transmission area, until the uplink data is received.

Optionally, the transmitter 40 is configured to send the configuration information to the terminal device.

Optionally, the air interface transmission parameter includes at least one of the following information: an uplink waveform, a multiple access manner, numerology, a maximum transmit power, a radio frame structure, or a channel coding scheme. The uplink waveform includes a single-carrier waveform or a multi-carrier waveform, the multiple access manner includes an orthogonal frequency division multiple access manner or a non-orthogonal multiple access manner, and the numerology includes a subcarrier spacing and a cyclic prefix length.

Optionally, if the multiple access manner includes the non-orthogonal multiple access manner, the air interface transmission parameter further includes at least one of the following information: a codebook and a pilot sequence, a signature matrix, a spread spectrum sequence, or a power domain superposition pattern.

Optionally, the configuration information is carried in at least one of the following information: system information, radio resource control RRC signaling, or physical layer control information.

Optionally, the physical layer control information includes a group common physical downlink control channel.

The base station provided in this embodiment of the present disclosure may execute the foregoing method embodiment. Implementation principles and technical effects thereof are similar, and details are not described herein again.

This application further provides a readable storage medium, and the readable storage medium stores an instruction. When at least one processor of a terminal device executes the instruction, the terminal device performs the grant-free uplink transmission method provided in any one of the foregoing method embodiments.

This application further provides a readable storage medium, and the readable storage medium stores an instruction. When at least one processor of a base station executes the instruction, the base station performs the grant-free uplink transmission method provided in any one of the foregoing method embodiments.

This application further provides a program product, the program product includes an instruction, and the instruction is stored in a readable storage medium. At least one processor of a terminal device may read the instruction from the readable storage medium, and execute the instruction, so that the terminal device implements the grant-free uplink transmission method provided in any one of the method embodiments.

This application further provides a program product, the program product includes an instruction, and the instruction is stored in a readable storage medium. At least one processor of a base station may read the instruction from the readable storage medium, and execute the instruction, so that the base station implements the grant-free uplink transmission method provided in any one of the foregoing method embodiments.

In specific implementation of a terminal device or a base station, it should be understood that a processor may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. Steps of the method disclosed with reference to this application may be directly performed and completed by a hardware processor, or may be performed and completed by a combination of hardware and a software module in the processor.

All or some steps in the foregoing method embodiment may be implemented by using hardware related to a program instruction. The foregoing program may be stored in a readable memory. When the program is executed, the steps in the foregoing method embodiment are performed. The foregoing memory (the storage medium) includes: a read-only memory (ROM), a RAM, a flash memory, a hard disk, a solid state disk, a magnetic tape, a floppy disk, an optical disc, and any combination thereof.

It may be clearly understood by a person skilled in the art that, for the purpose of convenient and brief description, division of the foregoing functional modules is used as an example for description. In actual application, the foregoing functions may be allocated to different functional modules and implemented as required. In other words, an inner structure of an apparatus is divided into different functional modules to implement all or some of the functions described above. For a specific working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the foregoing described apparatus embodiments are merely examples. For example, the module or unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on an actual need to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

If the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for enabling a computer device (which may be a personal computer, a server, a network device, or the like) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A grant-free uplink transmission method, comprising:
   receiving configuration information;
   determining, based on the configuration information, a target grant-free transmission area and a target air interface transmission parameter corresponding to the target grant-free transmission area, wherein the target grant-free transmission area is an air interface time-frequency resource formed by a time range and a frequency range, and wherein the configuration information comprises at least one grant-free transmission area and an air interface transmission parameter corresponding to each grant-free transmission area, wherein the air interface transmission parameter comprises a basic parameter and an extended parameter,
   wherein the basic parameter comprises an uplink waveform that comprises a single-carrier waveform or a multi-carrier waveform, wherein the single-carrier waveform comprises discrete Fourier transform spread orthogonal frequency division multiplexing (DFT-S-OFDM), and wherein the multi-carrier waveform comprises cyclic prefix orthogonal frequency division multiplexing (CP-OFDM); and
   wherein the extended parameter includes dynamic parameters comprising at least one of: numerology, a maximum transmit power, or a radio frame structure; and
   sending uplink data to a base station based on the target grant-free transmission area and the target air interface transmission parameter.

2. The method according to claim 1, wherein the determining, based on the configuration information, the target grant-free transmission area and the target air interface transmission parameter corresponding to the target grant-free transmission area comprises:
   determining, based on a service feature of the uplink data, the target grant-free transmission area and the target air interface transmission parameter from the at least one grant-free transmission area and the air interface transmission parameter corresponding to each grant-free transmission area; or
   determining, based on a size of the uplink data, the target grant-free transmission area and the target air interface transmission parameter from the at least one grant-free transmission area and the air interface transmission parameter corresponding to each grant-free transmission area; or
   determining, based on a buffer status of the uplink data, the target grant-free transmission area and the target air interface transmission parameter from the at least one grant-free transmission area and the air interface transmission parameter corresponding to each grant-free transmission area; or
   determining, based on channel state information of each grant-free transmission area, the target grant-free transmission area and the target air interface transmission parameter from the at least one grant-free transmission area and the air interface transmission parameter corresponding to each grant-free transmission area.

3. The method according to claim 1, wherein the target air interface transmission parameter further comprises a channel coding scheme.

4. The method according to claim 3, wherein the channel coding scheme comprises LDPC (low-density parity-check) or polar code.

5. The method according to claim 1, wherein the target air interface transmission parameter further comprises a radio frame structure.

6. The method according to claim 1, wherein the target air interface transmission parameter further comprises a multiple access manner.

7. The method according to claim 6, wherein the multiple access manner comprises an orthogonal frequency division multiple access (OFDMA) manner.

8. The method according to claim 6, wherein the multiple access manner comprises a non-orthogonal multiple access manner.

9. The method according to claim 8, wherein the multiple access manner comprises the non-orthogonal multiple access manner, the target air interface transmission parameter further comprises at least one of the following information: a signature matrix, a spread spectrum sequence, or a power domain superposition pattern.

10. The method according to claim 9, wherein the target air interface transmission parameter further comprises a codebook and a pilot sequence.

11. The method according to claim 1, wherein the configuration information is carried in at least one of the following information: system information, radio resource control (RRC) signaling, or physical layer control information.

12. The method according to claim 11, wherein the physical layer control information comprises a group common physical downlink control channel.

13. The method according to claim 1, wherein the numerology includes a subcarrier spacing and a cyclic prefix length.

14. A grant-free uplink transmission apparatus, comprising one or more processors, wherein the one or more processors are coupled to one or more memories storing program instructions for execution by the one or more processors to cause the apparatus to:
   receive configuration information;
   determine, based on the configuration information, a target grant-free transmission area and a target air interface transmission parameter corresponding to the target grant-free transmission area, wherein the target grant-free transmission area is an air interface time-frequency resource formed by a time range and a frequency range, and wherein the configuration information comprises at least one grant-free transmission area and an air interface transmission parameter corresponding to each grant-free transmission area, wherein the air interface transmission parameter comprises a basic parameter and an extended parameter,
  wherein the basic parameter comprises an uplink waveform that comprises a single-carrier waveform or a multi-carrier waveform, wherein the single-carrier waveform comprises discrete Fourier transform spread orthogonal frequency division multiplexing (DFT-S-OFDM), and wherein the multi-carrier waveform comprises cyclic prefix orthogonal frequency division multiplexing (CP-OFDM); and
  wherein the extended parameter includes dynamic parameters comprising at least one of: numerology, a maximum transmit power, or a radio frame structure; and
send uplink data to a base station based on the target grant-free transmission area and the target air interface transmission parameter.

15. The apparatus according to claim 14, wherein the determining, based on the configuration information, the target grant-free transmission area and the target air interface transmission parameter corresponding to the target grant-free transmission area comprises:
  determining, based on a service feature of the uplink data, the target grant-free transmission area and the target air interface transmission parameter from the at least one grant-free transmission area and the air interface transmission parameter corresponding to each grant-free transmission area; or
  determining, based on a size of the uplink data, the target grant-free transmission area and the target air interface transmission parameter from the at least one grant-free transmission area and the air interface transmission parameter corresponding to each grant-free transmission area; or
  determining, based on a buffer status of the uplink data, the target grant-free transmission area and the target air interface transmission parameter from the at least one grant-free transmission area and the air interface transmission parameter corresponding to each grant-free transmission area; or
  determining, based on channel state information of each grant-free transmission area, the target grant-free transmission area and the target air interface transmission parameter from the at least one grant-free transmission area and the air interface transmission parameter corresponding to each grant-free transmission area.

16. The apparatus according to claim 14, wherein the target air interface transmission parameter further comprises a channel coding scheme.

17. The apparatus according to claim 14, wherein the target air interface transmission parameter further comprises a multiple access manner, and the multiple access manner comprises an orthogonal frequency division multiple access (OFDMA) manner or a non-orthogonal multiple access manner.

18. The apparatus according to claim 14, wherein the numerology includes a subcarrier spacing and a cyclic prefix length.

19. A grant-free uplink transmission apparatus, comprising one or more processors, wherein the one or more processors are coupled to one or more memories storing program instructions for execution by the one or more processors to cause the apparatus to:
  determine configuration information, wherein the configuration information comprises at least one grant-free transmission area and an air interface transmission parameter corresponding to each grant-free transmission area, wherein the air interface transmission parameter comprises a basic parameter and an extended parameter,
    wherein the basic parameter comprises an uplink waveform that comprises a single-carrier waveform or a multi-carrier waveform, wherein the single-carrier waveform comprises discrete Fourier transform spread orthogonal frequency division multiplexing (DFT-S-OFDM), and wherein the multi-carrier waveform comprises cyclic prefix orthogonal frequency division multiplexing (CP-OFDM); and
    wherein the extended parameter includes dynamic parameters comprising at least one of: numerology, a maximum transmit power, or a radio frame structure; and
  receive, based on the at least one grant-free transmission area and the air interface transmission parameter corresponding to each grant-free transmission area, uplink data from a terminal device.

20. The apparatus according to claim 19, wherein the numerology includes a subcarrier spacing and a cyclic prefix length.

\* \* \* \* \*